Dec. 31, 1935.  E. POLACKOFF  2,025,893
TELESCOPIC BIFOCAL LENS
Filed July 9, 1935
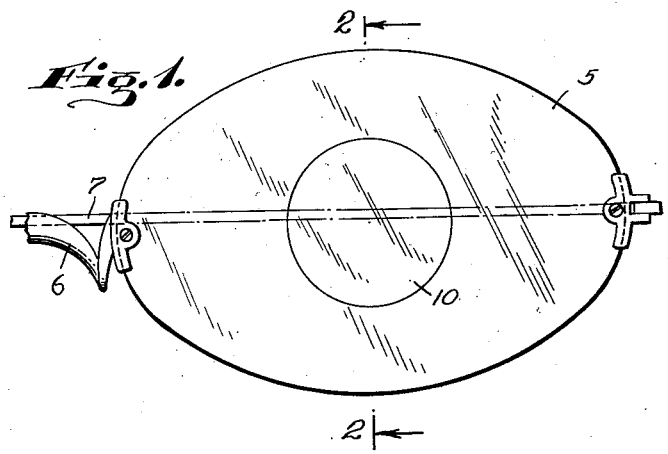
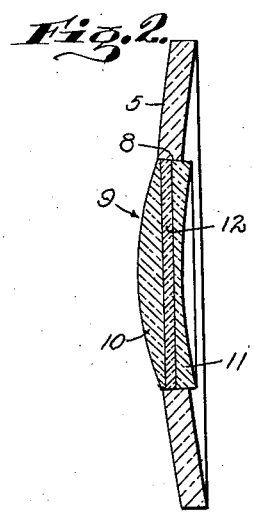
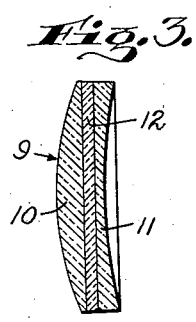
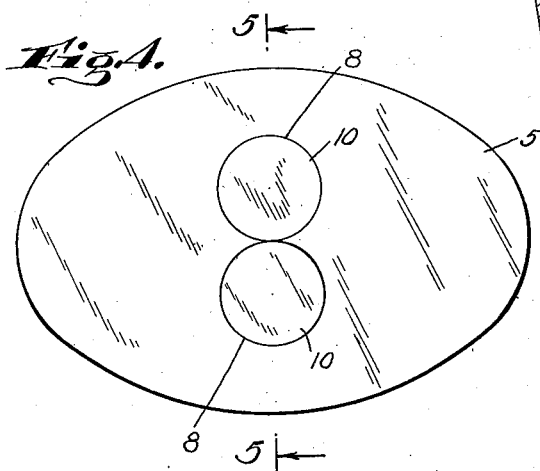
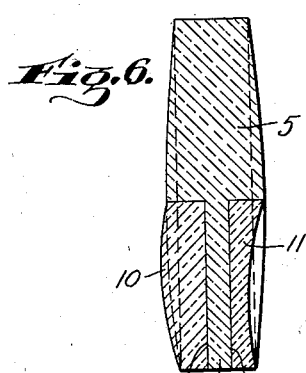
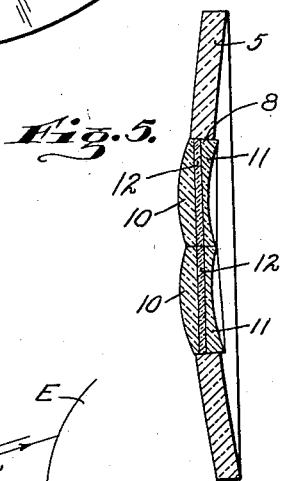
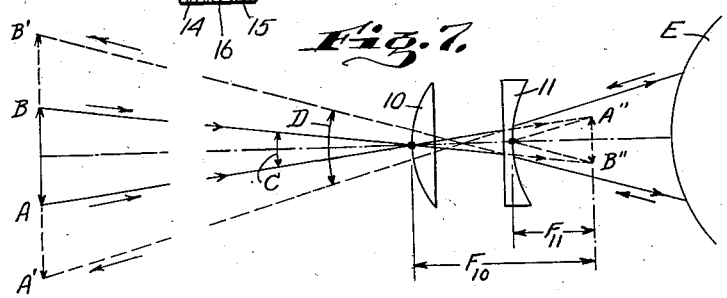
Edward Polackoff
INVENTOR
BY
ATTORNEY Patented Dec. 31, 1935

2,025,893

UNITED STATES PATENT OFFICE 2,025,893

TELESCOPIC BIFOCAL LENS

Edward Polackoff, New York, N. Y., assignor, by direct and mesne assignments, to The Univis Lens Company, Dayton, Ohio, a corporation of Ohio Application July 9, 1935, Serial No. 30,448

9 Claims. (Cl. 88—54)

The present invention relates to lenses and more particularly is concerned with bifocal lenses utilized in eye glass constructions.

The invention has as one object to provide in connection with a regular eye glass lens ground for vision adjustment, smaller minor lenses carried in spaced relation thereby and in alinement so that the retinal image is increased in size when glasses are utilized by people whose eyes have subnormal near vision after correction of the eyes with regular lenses.

The invention has as a further object to provide a telescopic bifocal lens having two flint segments or minor lenses secured to spaced portions of a major crown lens, the distant correction being ground into the crown lens and reading vision derived through the use of the spaced minor lenses, the minor lens disposed at the anterior portion of the major lens being of convex or positive power and the minor lens at the posterior position of the major lens being of negative power.

The invention has as a further object the provision of a telescopic bifocal lens having a major lens ground for vision adjustment comprising a transversely disposed bore in which an optical insert is secured comprising a pair of spaced minor lenses, the minor lens disposed at the forward portion of the major lens being of positive power and in optical alinement with the minor negative power lens at the posterior portion of the major lens while the focal planes of the positive and negative power minor lenses substantially coincide at the back of the posterior portion of the major lens.

According to my invention, in a telescopic bifocal lens and a pair of minor lenses, I provide, the arrangement in which the major lens has been ground for vision adjustment and disposed at its anterior portion is a minor lens of positive or convex power having its optical axis in alinement with the optical axis of a minor lens of negative or concave power attached to the posterior portion of the major lens, the relative space between and the powers of the minor lenses being such that a telescopic vision effect is produced without requiring adjustments of said lenses in respect to each other on the part of the wearer.

The foregoing and other features of the invention are illustrated in the accompanying drawing in which:

Fig. 1 is a fragmentary front elevational view of an eye glass construction according to one form of my invention.

Fig. 2 is a sectional view on the line 2—2 of Fig. 1.

Fig. 3 is a sectional view of the insert connected or fused to the major lens illustrated in Fig. 2.

Fig. 4 is a front elevational view of a trifocal lens according to the invention.

Fig. 5 is a sectional view on the line 5—5 of Fig. 4.

Fig. 6 is a sectional view of a slightly modified form of telescopic bifocal lens according to the invention and Fig. 7 is a schematic view of the telescopic bifocal lens according to the invention.

Referring to the drawing, 5 designates one lens of a pair of main or major eye glasses suitably interconnected by a bridge 6 and each provided with a swingable temple or arm 7 appropriately holding the eye glasses in position on the nose of the wearer.

According to the invention, the herein disclosed bifocal lens, is adapted to be utilized by people whose eyes have subnormal vision which may be corrected with regular lenses and the invention comprehends the provision of a bifocal lens to increase the size of the retinal image in eyes having subnormal near vision after being corrected with regular lenses. In this connection, the major or crown lenses 5 of the embodiments herein referred to have been initially ground for vision correction or adjustment and as illustrated in Figs. 1 and 2 each major lens comprises a transversely disposed bore 8 adapted to receive an optical insert generally designated 9 which comprises two spaced minor lenses 10 and 11 suitably fused or cemented to an intervening transparent plate or filler 12 having an index of refraction different from or less than the minor lenses 10 and 11 and of substantially the same index of refraction as the major lens although not necessarily limited thereto. Each of the minor lenses may be of flint glass or a suitable equivalent thereof and has an index of refraction higher than the major lens. The intervening transparent member or plate 12 may be of crown glass, barium crown or crown flint or a suitable equivalent thereof and if desired of a material having an index of refraction equal to or different from the major lens.

As shown in Fig. 3, the insert consists of a unitary member formed by appropriately fusing the minor lenses 10 and 11 to the anterior and posterior faces respectively of the intermediate member 12, the minor lens 10 having an anterior convex or positive face while minor lens 11 has a concave or negative posterior face. Accordingly convex lens 10 is of positive power and the concave lens 11 of negative power.

The insert 9 is bodily arranged in bore 8 of the major lens and appropriately cemented or fused in a manner well known in the art and as shown in Fig. 2, the positive lens 10 is disposed at the anterior part of the major lens while the concaved lens 11 is arranged at the posterior portion of the major lens, the minor lenses 10 and 11 having their optical axis in alinement and having their focal planes substantially coinciding as is evident from Fig. 7 in which the minor lenses 10 and 11 are so spaced apart that their focal planes coincide.

In Fig. 7, the distance designated $F_{10}$ is focal length of the convex lens 10. The focal length of the concaved lens is the distance represented by $F_{11}$. The object to be magnified is designated by BA and is generally located at a distant point, or stated in another way, a distance from the convex lens many times the focal length thereof. The angle of the rays that the object subtends is designated C. These rays are transmitted to the convex lens and would form an image A" B" if the minor concave lens 11 were not a part of the optical system. The rays transmitted through positive lens 10 however reach the minor concaved lens 11 and are slightly deflected outwardly thereby after which they travel into the eye E. Consequently the line of sight or the image that the eye sees is along the deflected rays emanating from the concaved lens. Hence object BA would be seen as a vertical and enlarged image B' A'. It follows therefore that the angle D that the image subtends is greater than the angle C subtended by its object. Hence the image of the object is magnified and the extent of the magnification is dependent upon a ratio of the focal lengths of the minor lenses or expressed mathematically is $$\frac{F_{10}}{F_{11}} = \frac{\text{Angle } D}{\text{Angle } C} > 1.$$

In the form according to Figs. 4 and 5 a trifocal lens is illustrated, the major lens 5 having been provided with two transversely disposed bores as 8 each adapted to receive optical inserts of the type illustrated in Fig. 3, the upper insert having been corrected for distant vision, the lower insert for near vision, while the major lens 5 has been initially ground for vision adjustment or correction.

According to the form shown in Fig. 6, major crown lens 5 has been ground for vision correction or adjustment and appropriately secured to spaced faces 14 and 15 of reduced portion or member 16 of the major lens is the spaced minor lenses 10 and 11 of the types illustrated in the preceding views.

In all of the forms disclosed, the minor positive lens 10 may be considered as disposed or secured in the anterior portion of the major lens while the negative minor lens 11 may be considered as arranged or secured within the posterior portion of the main or major lens. In Fig. 6, minor lenses 10 and 11 may be of flint glass and the major lens of crown glass. If desired, reduced portion 16 may be eliminated and the minor lenses 10 and 11 placed or secured back to back. With the form according to Figs. 2 and 5, intervening filler or plate 12 may also be eliminated and the minor lenses placed or secured back to back.

It is to be understood that the flint minor lenses may be ground or cemented to spaced portions of the major crown lens, the distance correction being ground into the major lens, and reading vision is derived through the use of the minor lenses.

It is evident that according to the invention a telescopic arrangement is provided in the use of a major lens and a pair of minor lenses having a predetermined spatial relation and powers such that a telescopic effect is produced. Accordingly provision has been made for increasing the size of the retinal image in eyes having a subnormal near vision after having been corrected with regular lenses, thereby providing a telescopic arrangement having lenses requiring no adjustment in respect to each other to be made by the wearer.

I am aware that telescopic spectacles of one kind or another have been employed but these are cumbersome and require adjustment and at the same time do not give the vision correction that is necessary in suiting the telescopic lenses to all eyes. I have provided the telescopic effect without losing advantage of the correction effect of the regular lenses and the telescopic effect is more pronounced because the eye has been accommodated by the use of the main lens which has been ground to suit the individual wearer.

While I have described my invention in detail and have referred to specific applications thereof, I do not intend that the embodiments herein disclosed shall be limited to such specific applications but intend that all matter contained in the above description or shown in the accompanying drawing shall be interpreted as illustrative and not in a limiting sense.

I claim:—

1. In a telescopic bifocal lens, the combination of, a major lens ground for vision correction and including a transversely disposed bore, and an insert secured to the wall of said bore comprising minor lenses of collecting and diverging powers, said minor lenses having their optical centres in alinement and their focal planes substantially coinciding at the back of said major lens, the minor lens of collecting power being disposed in the anterior portion of said major lens, the minor lens of diverging power being disposed in the posterior portion of said major lens, the relative space between and the powers of said minor lenses being arranged to produce telescopic vision with image magnification.

2. In a telescopic bifocal lens, the combination of, a major lens ground for vision correction and including a transversely disposed bore, and an insert secured to the wall of said bore, said insert comprising spaced minor lenses and an intervening transparent member secured to said minor lenses, the anterior minor lens of said insert being of positive power and the posterior lens of said insert being of negative power, said minor lenses having their optical centres disposed in alinement, the relative space between and the powers of said minor lenses being arranged to produce telescopic vision effect with image magnification.

3. In a telescopic bifocal lens, the combination of, a major lens ground for vision correction and including a transversely disposed bore, and an optical insert secured to the wall of said bore and comprising a minor lens of positive power, a minor lens of negative power, and an intervening transparent member secured to adjacent faces of said minor lenses, said minor lens of positive power being disposed in the anterior portion of said major lens, said minor lens of negative power being disposed in the posterior portion of said major lens, the optical centres of said minor lenses being in alinement and having their focal planes substantially coinciding in back of the posterior portion of said major lens, the relative space between and the powers of said minor lenses being arranged to produce telescopic vision effect with image magnification.

4. In a telescopic bifocal lens, the combination of, a major lens ground for vision correction and including a transversely disposed bore, and an insert secured to the wall of said bore and comprising a minor lens of positive power disposed in an anterior portion of said major lens and a minor lens of negative power disposed in a posterior portion of said major lens, said minor lenses having their optical centres in alinement and having their focal planes substantially coinciding at the back of the posterior portion of said major lens, the relative space between and the powers of said minor lenses being arranged to produce telescopic vision effect with image magnification.

5. In a telescopic bifocal lens, the combination of, a major lens ground for vision correction and comprising a transversely disposed bore, and an insert secured to the wall of said bore, said insert comprising a transparent member, a minor lens of positive power secured to the anterior face of said member, a minor lens of negative power secured to the posterior face of said member, said minor lenses having an index of refraction greater than the index of refraction of said major lens and said member, said minor lenses having their optical centres in alinement, the relative space between and the powers of said minor lenses being arranged to produce telescopic vision effect with image magnification.

6. In a telescopic bifocal lens, the combination of, a major lens of crown glass ground for vision correction and having a transversely disposed bore, and an optical insert secured to the wall of said bore and comprising a transparent member of crown glass, a minor flint lens of positive power secured to the anterior face of said member, a minor flint lens of negative power secured to the posterior face of said member, said minor lenses having their optical centres substantially in alinement, the relative space between and the powers of said minor lenses being arranged to produce telescopic vision effect with image magnification.

7. In a telescopic bifocal lens, the combination of, a major lens ground for vision correction and having a transversely disposed bore, and an insert secured to the wall of said bore, said insert comprising a transparent member, a minor positive lens secured to the anterior face of said member, a minor negative lens secured to the posterior face of said member, said minor lenses having their optical centres in alinement and their focal planes substantially coinciding at the back of the posterior portion of said major lens, said minor lenses having an index of refraction greater than the index of refraction of said member and major lens, the relative space between and the powers of said minor lenses being arranged to produce telescopic vision effect with image magnification.

8. In a telescopic bifocal lens, the combination of, a major lens ground for vision correction and having a transversely disposed bore, an insert secured to the wall of said bore, said insert comprising a transparent member, a minor lens of positive power secured to the anterior face of said member, a minor lens of negative power secured to the posterior face of said member, the optical centres of said minor lenses being substantially in alinement and having their focal planes substantially coinciding at the back of the posterior portion of said major lens, the index of refraction of said minor lenses being greater than the index of refraction of said major lens and member, said minor lenses being arranged in power and spacing to produce a magnified telescopic image of near objects.

9. The combination with a major lens having a transversely disposed bore, said lens being ground for vision correction for distant objects, a minor lens of positive power secured in the anterior portion and in the bore of said major lens, a minor lens of negative power secured in the posterior portion and in the bore of said main lens and spaced from said minor lens of positive power, the optical centres of said minor lenses being disposed in axial alinement, the relative space between and the powers of said minor lenses being arranged to produce a magnified telescopic image of near objects.

EDWARD POLACKOFF.